United States Patent [19]

MacLean

[11] Patent Number: 4,699,798

[45] Date of Patent: Oct. 13, 1987

[54] NATURAL COFFEE SUBSTITUTE

[76] Inventor: Mary MacLean, 7315 - 1st Street, Burnaby, B.C., Canada, V3N 3S7

[21] Appl. No.: 495,009

[22] Filed: May 16, 1983

[30] Foreign Application Priority Data

Apr. 15, 1983 [CA] Canada .................................. 425943

[51] Int. Cl.⁴ .............................................. A23F 5/44
[52] U.S. Cl. .................................................. 426/596
[58] Field of Search ........................................ 426/596

[56] References Cited

U.S. PATENT DOCUMENTS

| | | | |
|---|---|---|---|
| 1,064,768 | 6/1913 | Post | 426/596 |
| 1,098,683 | 6/1914 | Post | 426/596 |
| 1,119,849 | 12/1914 | Malcolm | 426/596 |
| 1,150,303 | 8/1915 | Porter | 426/596 |
| 1,177,037 | 3/1916 | Kellogg | 426/596 |
| 1,189,131 | 6/1916 | Kellogg | 426/596 |
| 1,204,032 | 11/1916 | Kellogg | 426/596 |
| 1,204,358 | 11/1916 | Kellogg | 426/596 |
| 1,224,271 | 5/1917 | Brown | 426/596 |
| 1,414,557 | 5/1922 | Ellis | 426/596 |

FOREIGN PATENT DOCUMENTS

| | | | |
|---|---|---|---|
| 406302 | 11/1943 | Italy | 426/596 |
| 2758 | of 1870 | United Kingdom | 426/596 |
| 751 | of 1881 | United Kingdom | 426/596 |
| 18441 | of 1904 | United Kingdom | 426/596 |

OTHER PUBLICATIONS

Bruttini, Uses of Waste Material 1923, P. S. King & Son, Ltd.: Westminster, pp. 72-74.
Winton et al., The Structure and Composition of Foods, vol. II, 1935, John Wiley & Sons: New York, pp. 145-147.

*Primary Examiner*—Joseph Golian
*Attorney, Agent, or Firm*—Millen & White

[57] ABSTRACT

A natural coffee substitute and process for preparing same are provided herein. It comprises dry roasted artichoke comprising 75% to 25% by weight Jerusalem artichoke (Heliauthus tuberosus N.O. composite) and correspondingly 25% to 75% by weight Chinese artichoke [Stockys Sieboldii; Chinese native name "T Sa-nyungtzu"; Japanese native name "Chorogi"]. The artichoke coffee substitute is not cancer forming or causing, has good coloring, and blends with many other foods. It can be added to other foods which may be baked or cooked in any style. The artichoke coffee substitute will keep well if stored properly. It has no oils that would make it costly to produce. Nothing need be added for any reason. It is not habit forming and is not in any way injurious to health.

1 Claim, No Drawings

NATURAL COFFEE SUBSTITUTE

BACKGROUND OF THE INVENTION

(1) Field of the Invention

This invention relates to a natural coffee substitute.

(2) Description of the Prior Art

As is well known, coffee is prepared from roasting coffee beans to a dark roast colour, with the beans thereafter being ground to provide what is commonly referred to as fresh roast and ground coffee. Because of the special climate conditions for growing of coffee, Canada, the United States and many other colder climates of the world are totally dependent upon imports for their source of coffee. This dependency upon importations has made the price of coffee fluctuate greatly depending upon the availability of imported coffee beans, such conditions as government stability in the exporting countries, and economically motivated export policies from the coffee growing countries. This increased cost of coffee in recent times has become a financial burden for coffee drinkers and those institutional users, e.g., stores, restaurants and office coffee service groups. There is, therefore, a need for an economical coffee product at prices only a fraction of the present prices.

Coffee is used extensively as a beverage and as a flavouring for various food products. Caffeine in coffee is a stimulant and is objectionable if consumed in excessive quantities and frequently is objectionable if consumed in normal quantities by persons afflicted with heart disease. Doctors frequently request patients not to use coffee or to use it in small quantities. Since coffee is habit-forming, it is difficult for the patients to comply. Coffee, by reason of its stimulating nature, frequently causes insomnia when consumed at night.

Numerous attempts have been made to find a substitute for coffee which does not contain caffeine. Generally, materials of vegetable origin modified by roasting have been employed for such purposes. One such product known by the trade mark POSTUM is made from wheat, bran and molasses, and has been sold in large quantities for many years. Other products, e.g., that known by the trade mark SANKA, utilize coffee but remove substantially all of the caffeine from it. Such products simulate coffee but there is a substantial difference in their taste and aroma and in the taste and aroma of real coffee.

Another typical commercial coffee surrogate is a roasted blend of molasses and/or sucrose and cereal grains, e.g., wheat and/or barley, the molten mixture being heated to the carmelization temperature typically in the neighbourhood of 375° F. or slightly thereabove to develop flavour. The flavour of this product is characteristicly bitter and acidic. Among many coffee and non-coffee users, the flavour is not preferred.

Other coffee substitutes which are in the cold water soluble or hot water soluble form are aqueous extracts of the toasted mixture which are thereafter dried as by vacuum drying, during which drying a moderate amount of flavour alteration may also occur incident to dehydration. Such extracts also are characterized by an acidic bitter principle in beverage flavour.

Other prior art emphasizes the use of coffee substitutes, e.g., roasted garbanzo beans, barley, chicory or wheat, alone or as additions to coffee. The mixed components tend to separate in the can during transport. Accordingly, there is a lack of uniformity in the taste of the beverage brewed from such commercially available coffee with substitutes. Also, these substitutes usually have only marginal appearance of real roasted and ground coffee.

U.S. Pat. No. 3,158,485 issued Nov. 24, 1964 to V. De Santa Luce et al provides a food product containing a coffee substitute which comprises essentially the combination of a liquid mix derived from the vines of tomatoes and a liquid mix derived from dandelions.

U.S. Pat. No. 3,966,995 issued June 29, 1976 to R. A. Workman provides a material useful for brewing a beverage simulating coffee comprising the outer zone or cortex of carrot root subdivided and roasted to a dark brown colour and essentially devoid of the wood or pith of the core of the carrot root, colour and odour.

U.S. Pat. No. 4,022,916 issued May 10, 1977 to D. J. LaTour provides a process for preparing a coffee-substituted beverage comprising the steps of: (a) roasting a mixture of a cereal and a polysaccharide at a temperature above 375° F. and for a period between 15 and 200 minutes; (b) aqueously extracting the roasted mixture of step (a); (c) drying the aqueous extract to a moisture content of about 2%; (d) blending the dried extract with from 5 to 40% finely divided roasted carob seed; (e) agglomerating the blend of step (d) by means of steam until an agglomerate is produced, the agglomerate having a moisture content of between 3 and 5.5% and a bulk density of from 0.25 to 0.33 grams per cc; and (f) further drying the agglomerate to a moisture content of 1 to 3%.

U.S. Pat. No. 4,187,324 patented Feb. 5, 1980 by Shirboun provides a coffee-like beverage product prepared solely from soybeans. By the combination of conditions employed, the result is a ground and roasted soybean product which can be substituted for coffee, and which tastes and appears remarkably like coffee. The process involves removing most of the oil from green soybeans, crushing the green soybeans, grinding the crushed green soybeans, and thereafter roasting them.

U.S. Pat. No. 4,188,409 issued Feb. 12, 1980 to C. Kay provides a granular product to be used for brewing a high yield; coffee testing beverage, formed of coffee flavoured extract from pulverized roasted and ground coffee impregnated into and coated onto edible nut shell particles, utilizing only a fraction of roasted and ground coffee of that normally necessary to produce comparable beverage yields.

SUMMARY OF THE INVENTION

(i) Aims of the Invention

In spite of these and many other vegetable coffee substitute materials, there is still the need for a pure vegetable coffee substitute. Objectionable features of all such materials are, first, their failure closely to simulate in the brewed beverage the flavour of coffee, and, second, the giving off of an odour during brewing and in the brewed beverage which is uncharacteristic of coffee and suggestive of the source material.

Accordingly, one object of the present invention is to provide an improved coffee substitute made from vegetable materials and having an aroma and taste approximating that of real coffee.

Another object of this invention is to provide an improved method of making coffee substitutes and other food products.

Another object of the present invention is to provide a coffee substitute having an aroma and taste approximating that of real coffee which is less expensive than real coffee and made from vegetables easily grown in most countries of the world.

Yet another object of the invention is to provide coffee-flavoured soft drinks by combining the coffee substitute with carbonated water.

A further object of the invention is to provide a coffee substitute for use in candles, ice cream and other food products.

A further object of the invention is to provide a food product which will serve as a booster or additive for real coffee to improve its aroma and flavour.

Another object of the present invention is to provide a coffee substitute which is distinctive and has coffee-like beverage qualities but is less acid and bitter than coffee or prior art substitutes therefor.

A further and more specific object of the invention is to provide a beverage composition which is soluble in either cold or in hot water and which can be reconstituted into a brew which is more balanced in flavour, more rounded in taste impact and has less acidity than coffee or prior art substitutes.

Yet another object of this invention to prepare a consumer-acceptable coffee substitute beverage which can be prepared from locally grown materials so that dependency upon foreign imports in the preparation of coffee beverages can be reduced.

Still another object of this invention is to prepare a coffee substitute beverage which is considerably less expensive than roasted and ground coffee.

Yet a further object of this invention is to prepare a ground and roasted coffee-like product which has not only the appearance but also the taste of roasted and ground coffee.

Still a further object of this invention is to prepare a coffee-like ground and roasted product which, when prepared in extract form, does not contain caffeine.

Yet another important object of this invention is to prepare a product which not only has the appearance and taste of coffee, but also one which can be used in the same volumetric measurements as roasted and ground coffee so that beverage users will not have to change their measurement habits.

(ii) Statements of Invention

The present invention provides an inexpensive, improved coffee substitute having a true coffee aroma and flavour. The invention attains this result from ingredients readily available in most countries and in most climates without requiring the importation of coffee or similar products from countries having tropical climates.

By this invention, a natural coffee substitute is provided comprising dry roasted artichoke comprising 75% to 25% by weight Jerusalem artichoke (Heliauthus tuberosus N.O. composite), and correspondingly 25% to 75% by weight Chinese artichoke [Stockys Sieboldii; Chinese native name "T Sanyungtzu"; Japanese native name "Chorogi"],.

By this invention as well, a process is provided for the production of a natural coffee substitute comprising dry roasted artichoke comprising 0%–100% by weight Jerusalem artichoke (Heliauthus tuberosus N.O. composite) and correspondingly 100%–0% by weight Chinese artichoke [Stockys Sieboldii; Chinese native name "T Sanyungtzu"; Japanese native name "Chorogi"], which process comprises: (1) slicing the artichokes; (2) dry roasting the sliced artichokes at a temperature of 200° F. to 250° F.; and (3) crushing the dry roasted artichokes to a powdered or dry aggregate size.

(iii) Other Features of the Invention

By other features of the process of this invention, the roasting may be carried out batchwise in an oven on a tray or may be carried out continuously by means of a conveyor belt passing through a heated zone.

Description of Preferred Embodiments (i) Generalized Description of the Invention The preparation of the artichoke natural coffee substitute of this invention includes first cleaning and slicing the Jerusalem artichoke and Chinese artichoke. The desired proportions of sliced or subdivided Jerusalem artichoke and Chinese artichoke may then be spread thinly on a metal sheet and subjected to roasting batchwise by heating it in an oven at 200° F. to 250° F. for 20 minutes or until it turns dark brown. Alternatively, the sliced or subdivided Jerusalem artichoke and Chinese artichoke may be placed on a conveyor belt which slowly moves through an oven at 200° F. to 250° F. to roast the artichokes continuously. The temperature and the time should be coordinated such that the artichokes are toasted but not cooked. The heat should not be too hot since the heat just darkens the artichokes but does not seem to effect flavour, unless the heat is so hot that the artichokes are burnt. Due to the natural starch in the artichokes, too high a heat may be damaging to the flavour.

Once the artichokes have been roasted, they are crushed to powdered or small aggregate size. The crushing should not be so severe as to result in the production of a fine powder.

The portions of Jerusalem artichoke to Chinese artichoke balance of mixture depends on people's taste. The colour is good and the mixture can be roasted to light medium brown, dark or almost black.

OPERATION OF PREFERRED EMBODIMENTS

A beverage closely simulating coffee both in taste and odour, as well as colour, was then brewed from this roasted material in a conventional percolator using the same proportions of dry material to water as would be used in brewing coffee. Alternatively, the coffee substitute can be used as instant coffee, percolator coffee, "Swedish" coffee (boil for one minute) or "drip" coffee. It may further be consumed at a single teaspoon serving for a cup measure and will provide a pleasant tasting beverage. The artichoke natural coffee substitute of this invention can be blended with any other so-called coffee substitutes and/or with real coffee. Such artichoke natural coffee substitute has its own natural sweetener, but the usual sweeteners may be added. Other additions, e.g., cream/milk or cream/milk substitutes blend well with this artichoke coffee.

FURTHER DESCRIPTION OF THE INVENTION

With respect to the horticulture of Jerusalem artichokes, if the artichokes are to be grown rather than purchased, Jerusalem artichokes store best if kept in the ground and processed just after harvest. Harvesting can be done at any time of the year in the following manner: Cut the plant down when the leaves decay and then additional growth goes to the tubers. If taken up, they can be stored in sand or earth, but they should be covered since light and air make the tubers too dark when cooked. On the other hand, light and air are desirable to cut roasting time should a dark colour be desired. Frost does not injure the plant. The best species to utilize is the "New White Mammoth"; it produces a rounded tuber which is easier for slicing prior to roasting. The "red" tuber is just as good a quality for any desired result. The tubers' area should be changed ever three years for best growth results.

Chinese artichoke is a member of the mint family and grows wild in Northern China. Its principal constituents are 16.6% carbinaceous substance, 3.2% nitrogenous substance and 78.3% water. This variety is very easy to grow and is a very good producer of the tubers used in the artichoke natural coffee substitute of this invention.

SUMMARY

The Jerusalem/Chinese artichoke (Heliauthus tuberosus N.O. composite) natural coffee substitute of this invention can also be utilized in cooking and baking for the desired "coffee" look and/or flavour. For example, it may be used to provide coffee-flavoured soft drinks by combining this artichoke natural coffee substitute with carbonated water. Furthermore, it may be used to provide a coffee flavour in candies, ice cream, baked goods, etc..

The artichoke natural coffee of this invention is not cancer forming or causing, has good colouring, and blends with many other foods. It can be added to other foods which may be baked or cooked in any style. The artichoke natural coffee substitute will keep well if stored properly. It has no oils that would make it costly to produce. Nothing need be added for any reason. It is not habit-forming and it is not in any way injurious to health.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A natural coffee substitute comprising dry roasted artichoke comprising 75% to 25% by weight Jerusalem artichoke (Heliauthus tuberosus N.O. composite) and, correspondingly, 25% to 75% by weight Chinese artichoke (Stockys Sieboldii; Chinese native name "I Sanyungtzu"; Japanese native name "Chorogi").

* * * * *